April 28, 1970   L. B. ROOT   3,508,516
WAVE PROPELLED BOAT
Filed May 13, 1968
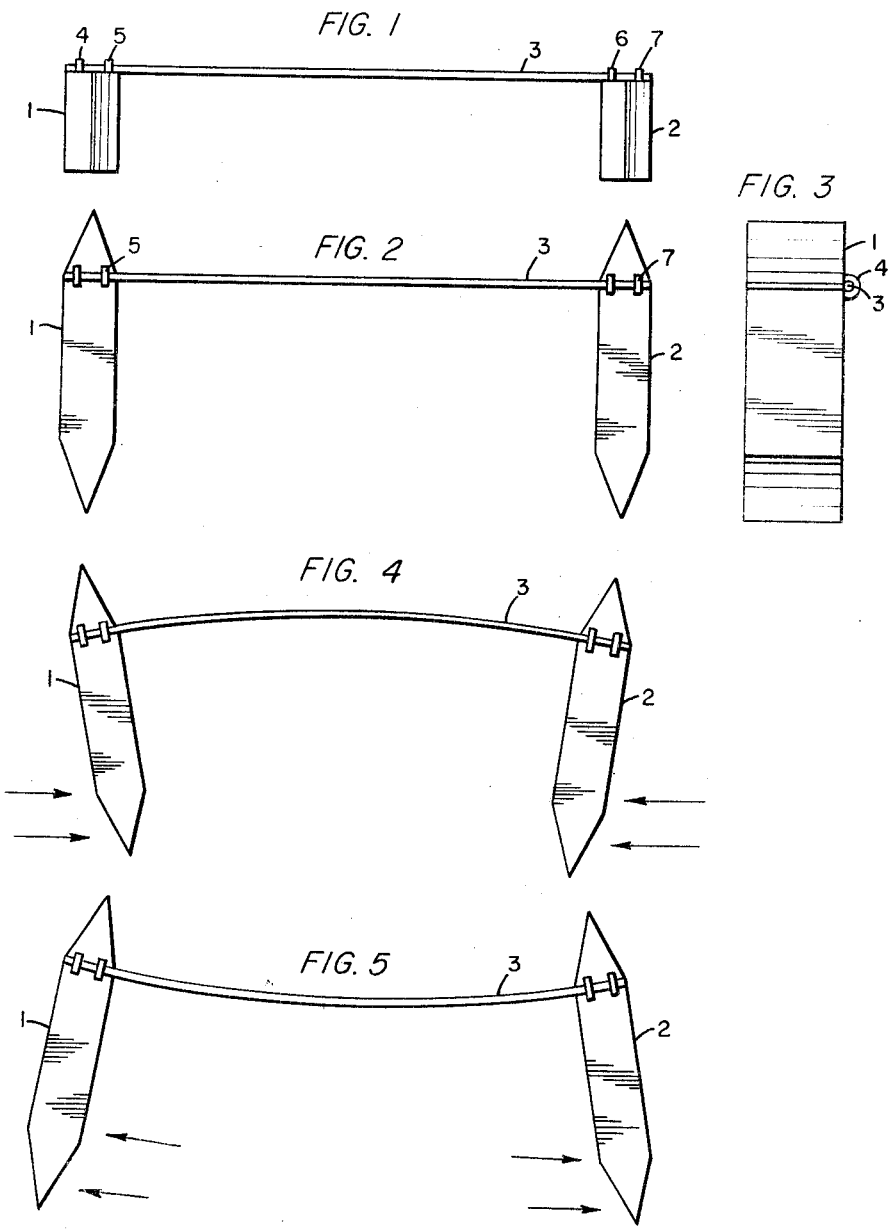
INVENTOR.
LLOYD B. ROOT

United States Patent Office 3,508,516
Patented Apr. 28, 1970

3,508,516
WAVE PROPELLED BOAT
Lloyd B. Root, 370 Thompson St.,
North Tonawanda, N.Y. 14120
Filed May 13, 1968, Ser. No. 728,860
Int. Cl. B63h 19/02
U.S. Cl. 115—4                            2 Claims

ABSTRACT OF THE DISCLOSURE

A device which, when attached to boats, utilizes the power of the waves to propel the boat.

BRIEF SUMMARY OF THE INVENTION

This invention is normally held in a horizontal position at or near the surface of the water, in which case it utilizes the lateral motion of the waves to propel itself or the boat to which it is attached.

The invention can also be held in a vertical position with one end well below the surface of the water; in which case it utilizes the vertical motion of the waves to propel itself and any boat to which it may be attached.

BRIEF DESCRIPTION OF THE FIGURES OF THE DRAWINGS

FIGURE 1 is a the view of this device from the front.
FIGURE 2 is the view from the top.
FIGURE 3 is the view of the side.
FIGURE 4 is the view from the top when currents of water are pushing in from each side as indicated by the arrows.
FIGURE 5 is a view from the top when current of water are pushing out against each propeller as indicated by the arrows.

WAVE POWER BOAT PROPULSION UNIT

This machine uses the power of the waves to propel a boat.

1 and 2 are floating propellers. They may also serve as boats in which people ride.

3 is an elongated flexible device connecting the floating propellers 1 and 2.

4, 5, 6 and 7 are brackets which attach the elongated connecting device to the propellers.

In order to understand why this device is able to function, it is first necessary to understand certain facts about waves on the surface of a body of water.

Everyone who looks over a body of water can see the waves rolling in and he can pretty well gauge the amount of vertical motion at the surface of the water. He may not realize, however, that there is as much lateral as vertical motion in every wave.

Approximately one half of the water under the influence of any given wave has a lateral movement in the direction of the wave and the rest of the water in the wave has an equally strong lateral motion in the opposite direction.

This wave power machine is able to make use of the difference in speed and direction of the water at different points in a body of water under the influence of waves. It can function between the masses of water moving in opposite directions, or between a stationary body of water and one that is moving; or between two masses of water moving in the same direction with different speeds.

In FIG. 1, FIG. 2 and FIG. 3 the wave propulsion machine is shown in the position which it assumes when it is not under the influence of the waves.

In FIG. 4 the currents of water are pressing in from both sides due to the lateral motion of the water under the influence of the waves. After having bent the device into the position shown in this diagram, any further movement of the water, in the direction indicated by the arrows, forces the boat forward.

In FIG. 5 the wave has advanced far enough so that the lateral wave motion of the water in which the propellers rest has reversed itself. It now presses outwardly against each propeller, causing them to assume the position shown in FIG. 5. After forcing the device into this position any further movement of the water in the direction indicated by the arrows again drives the boat forward.

If anyone, for any reason, should wish to make use of the vertical motion of the waves to propel a boat, he can place this device in the water with the connecting device 3 in a vertical position and with one propeller well below the surface of the water and the other close to the surface. In this position the device functions, but at reduced speed, because of the fact that the elongated device 3 is now under water offering resistance to the forward motion of device.

This device can be used as a boat in which people ride or it can push or pull other boats through the water. Any number of these devices can be attached to a single boat.

This device would still work efficiently if the elongated member 3 was stiff and the propellers were flexible; or if both the elongated member 3 and the propellers were stiff, and devices could be introduced at the joints between the elongated member 3 and the propellers 1 and 2 to permit limited lateral movement of the propellers. Such minor changes can be made without departing from the spirit of this invention.

What is claimed is:

1. A reaction-propelled aquatic device comprising, in combination,
a pair of elongate hull members, each having longitudinally extending side surfaces adapted to act as reaction surfaces for water having movement angularly with respect to the longitudinal centerlines of said hull members, and
resilient means interconnecting said hull members normally to position said hull members in substantially parallel relation, said resilient means interconnecting said hull members only adjacent one end thereof, whereby said side surfaces of the hull members may swing out of parallelism as water reacts thereagainst.

2. The aquatic device as defined in claim 1 wherein said resilient means comprises a resilient rod anchored at its opposite ends to said hull members.

References Cited

UNITED STATES PATENTS

| | | | |
|---|---|---|---|
| 1,663,888 | 3/1928 | Osten | 114—123 |
| 3,310,019 | 3/1967 | Standridge et al. | 114—123 |

FOREIGN PATENTS 1,467,880    12/1966    France.

A. H. FARRELL, Primary Examiner

U.S. Cl. X.R.
115—19